(12) United States Patent
Taguchi

(10) Patent No.: US 11,842,242 B2
(45) Date of Patent: Dec. 12, 2023

(54) MOUNTING MEMBER WITH IC TAG

(71) Applicant: Osaka Rashi Hambai Co., Ltd., Osaka (JP)

(72) Inventor: Kazuhito Taguchi, Osaka (JP)

(73) Assignee: OSAKA RASHI HAMBAI CO., LTD., Osaka (JP)

( * ) Notice: Subject to any disclaimer, the term of this patent is extended or adjusted under 35 U.S.C. 154(b) by 0 days.

(21) Appl. No.: 17/908,094

(22) PCT Filed: Feb. 16, 2021

(86) PCT No.: PCT/JP2021/005628
§ 371 (c)(1),
(2) Date: Aug. 30, 2022

(87) PCT Pub. No.: WO2021/177018
PCT Pub. Date: Sep. 10, 2021

(65) Prior Publication Data
US 2023/0095691 A1 Mar. 30, 2023

(30) Foreign Application Priority Data
Mar. 2, 2020 (JP) .................................. 2020-034836

(51) Int. Cl.
*G06K 19/077* (2006.01)
*F16B 23/00* (2006.01)

(52) U.S. Cl.
CPC ........ *G06K 19/07758* (2013.01); *F16B 23/00* (2013.01)

(58) Field of Classification Search
CPC ............ G06K 19/07758; F16B 23/00

USPC ......................................................... 235/492
See application file for complete search history.

(56) References Cited

U.S. PATENT DOCUMENTS

| 10,450,174 | B1 * | 10/2019 | Kucinic | .................. B66C 13/16 |
| 2004/0240960 | A1 * | 12/2004 | Daly | ..................... F16B 13/124 411/16 |
| 2006/0267843 | A1 | 11/2006 | Sakama et al. | |

(Continued)

FOREIGN PATENT DOCUMENTS

| JP | 54-54771 | 4/1979 |
| JP | 2006-333403 | 12/2006 |

(Continued)

OTHER PUBLICATIONS

International Search Report dated May 18, 2021 in corresponding International Application No. PCT/JP2021/005628.

*Primary Examiner* — Allyson N Trail
(74) *Attorney, Agent, or Firm* — Wenderoth, Lind & Ponack, L.L.P.

(57) ABSTRACT

Provided is a mounting member with an IC tag, the mounting member being easily manufactured and configured so as to not have constraints in terms of attachment orientation. The mounting member with an IC tag is provided with: a shaft-shaped section 1 having a shaft-shaped insert part 11 and a base part 12 which is formed by one end section of the insert part 11 protruding in the width direction; an IC tag 2 fixed to a surface 123 of the base part 12; and a resin head part 3 which is molded to at least the surface 123 side of the base part 12 so as to seal the IC tag 2. Male threads are preferably formed on the insert part 11.

4 Claims, 4 Drawing Sheets

(56) References Cited

U.S. PATENT DOCUMENTS

| | | | |
|---|---|---|---|
| 2012/0298758 A1* | 11/2012 | Vishwanath | A61B 90/98 235/492 |
| 2019/0159820 A1* | 5/2019 | Geist | A61B 17/863 |
| 2019/0160479 A1* | 5/2019 | Yamauchi | B05B 5/0407 |
| 2021/0097364 A1* | 4/2021 | Salsberg | G06K 19/07788 |
| 2021/0355766 A1* | 11/2021 | Skaarsjoe | G01L 5/24 |
| 2022/0015813 A1* | 1/2022 | Cordaro | A61B 17/8625 |

FOREIGN PATENT DOCUMENTS

| | | |
|---|---|---|
| JP | 2011-241567 | 12/2011 |
| JP | 2014-238743 | 12/2014 |
| WO | 2006/054508 | 5/2006 |

* cited by examiner

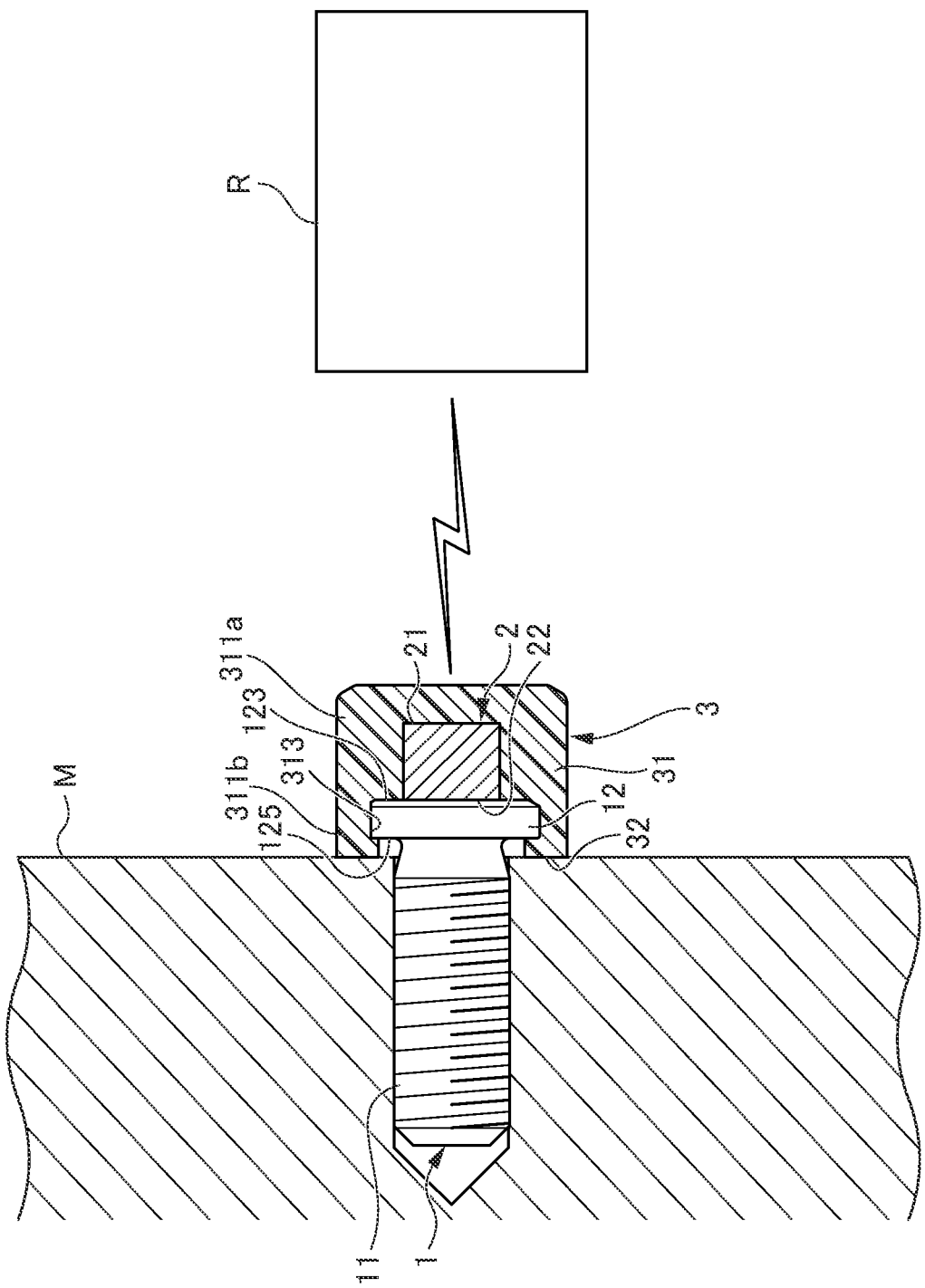

MOUNTING MEMBER WITH IC TAG

TECHNICAL FIELD

The present invention relates to a mounting member with an IC tag in which an IC tag is built in the head portion of the mounting member such as a bolt having a head portion or a pin having a head portion.

BACKGROUND ART

Various mounting members with an IC tag provided with an IC tag have been provided. For example, Patent Document 1 discloses a bolt in which a hole is formed on a top surface of a head portion provided at one end of a threaded portion, and the hole is used as a housing portion of an IC tag. A plate-shaped magnetic body is disposed at the bottom of the housing portion. An electromagnetic induction type non-contact IC tag is placed on the magnetic body. The housing portion, in which the magnetic body and the IC tag are disposed, is filled with a filler made of a heat-resistant resin. The opening of the housing portion is closed by a lid made of a ceramic or a heat-resistant resin.

A resin coating layer is formed on the outer peripheral surface of the bolt and the outer surface of the lid. The resin coating layer is formed by adhering resin powder to the outer peripheral surface of the bolt and the outer surface of the lid, heating and melting the resin powder, and cooling the molten resin powder resin. The molten resin powder enters the gaps between the housing portion of the bolt and the lid and the gaps between the housing portion of the bolt and the filler. The resin that has entered prevents foreign substances such as dust and rainwater from entering the gaps. The bolt covered with the resin coating layer and having the IC tag built-in is used as an IC tag mounting structure for managing information on a device and a machine.

Patent Document 1: Japanese Unexamined Patent Application, Publication No. 2014-238743

DISCLOSURE OF THE INVENTION

Problems to be Solved by the Invention

Since the IC tag mounting structure disclosed in Patent Document 1 incorporates the IC tag in the head portion of the bolt, the IC tag mounting structure includes many time-consuming processes, such as not only placing the plate-shaped magnetic body and the IC tag and filling the filler in the housing portion formed in the head portion, but also attaching, heating, and melting the resin powder, and cooling the molten resin to form the resin coating layer. Therefore, since the IC tag mounting structure disclosed in Patent Document 1 has poor productivity, it is costly.

In the IC tag mounting structure disclosed in Patent Document 1, the head portion of the bolt other than the lid closing the housing portion surrounds the IC tag. The bolt is generally made of metal such as aluminum or stainless steel. Therefore, the IC tag mounting structure has communication directivity regardless of whether the IC tag is an electromagnetic induction type or a radio wave communication type,
it is necessary to mount the IC tag mounting structure so that the lid faces the communication target. That is, the IC tag mounting structure has restrictions on the mounting direction.

It is an object of the present invention to provide a mounting member with an IC tag that can be easily manufactured and has no restrictions on the mounting direction.

Means for Solving the Problems

A mounting member with an IC tag according to the present invention includes:
a shaft-shaped portion including an insert portion having a shaft shape and a base portion projecting in a width direction at one end of the insert portion;
an IC tag fixed on a front surface of the base portion; and a head portion made of resin, within which at least a front surface side of the base portion is molded so as to seal the IC tag.

In the mounting member with an IC tag according to the present invention,
a male thread is formed on the insert portion.

In the mounting member with an IC tag according to the present invention,
the head portion includes a folded-back portion bending and extending to an outer circumferential portion of a back surface of the base portion.

In the mounting member with an IC tag according to the present invention,
the base portion is formed in a disk shape and includes a chamfered portion on a part of its outer peripheral surface. The head portion includes a locking portion joined to the chamfered portion.

In the mounting member with an IC tag according to the present invention,
the head portion is formed in a cylindrical shape and has an outer peripheral surface having a knurl pattern.

Effects of the Invention

According to the present invention, it is possible to provide a mounting member with an IC tag that can be easily manufactured and has no restrictions on the mounting direction.

BRIEF DESCRIPTION OF THE DRAWINGS

FIG. 4 is a partial sectional front view showing an example of a use state of the mounting member with an IC tag according to the present invention.

PREFERRED MODE FOR CARRYING OUT THE INVENTION

Figure 1:
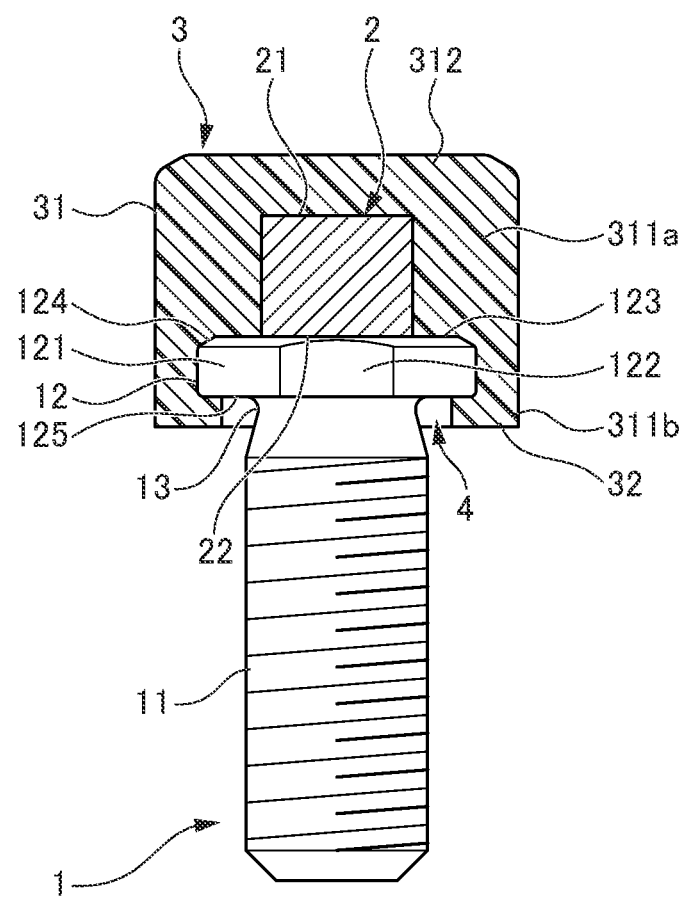
FIG. 1 is a sectional front view showing one embodiment of a mounting member with an IC tag according to the present invention.
Figure 2:
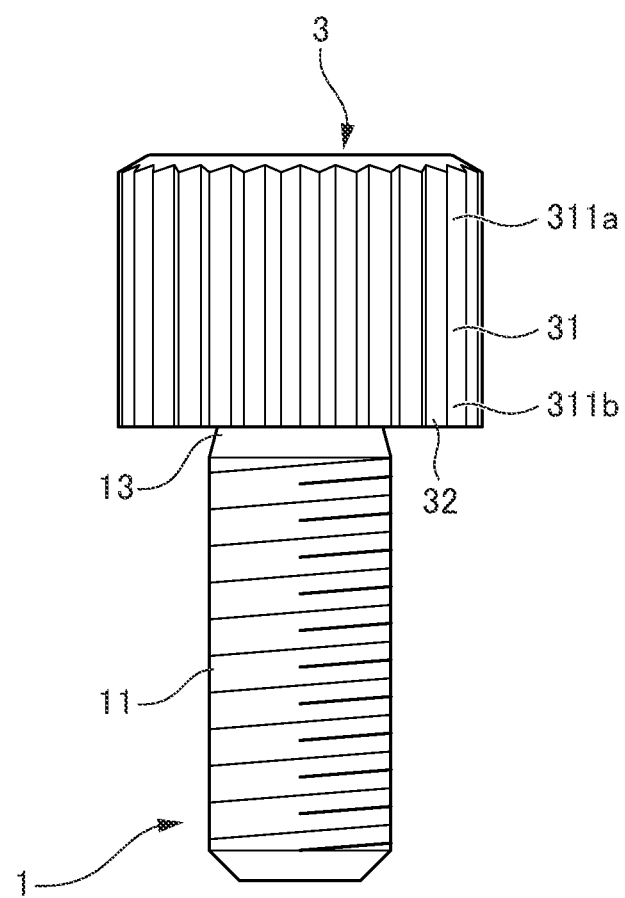
FIG. 2 is a front view showing the embodiment of the mounting member with an IC tag according to the present invention.
Figure 3:
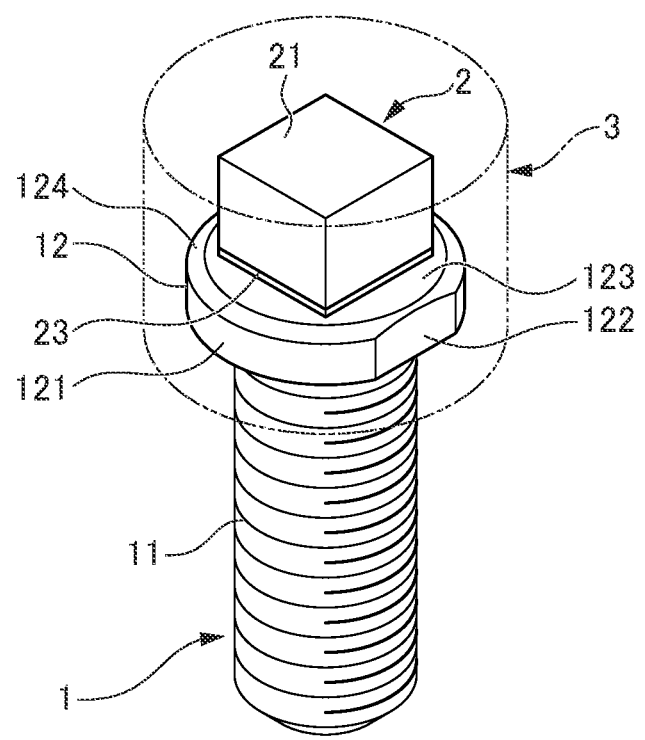
FIG. 3 is a schematic perspective view showing the embodiment of the mounting member with an IC tag according to the present invention.

One embodiment of a mounting member with an IC tag according to the present invention will now be described with reference to FIGS. 1 to 4. FIG. 1 is a sectional front view showing one embodiment of a mounting member with an IC tag according to the present invention. FIG. 2 is a front view showing the embodiment of the mounting member with an IC tag according to the present invention. FIG. 3 is a schematic perspective view showing the embodiment of the mounting member with an IC tag according to the present invention. FIG. 4 is a partial sectional front view showing an example of a use state of the mounting member with an IC tag according to the present invention.

The mounting member with an IC tag includes not only a fastening member such as a bolt or a screw that engages with a female thread or a nut but also a pin inserted into a shaft hole. However, since the mounting member with an IC tag in the present embodiment is an example of a mounting member such as a bolt, hereinafter, a "bolt with an IC tag" will be mainly described. As shown in FIG. 1, the bolt with an IC tag includes a shaft-shaped portion 1, an IC tag 2, and a head portion 3.

The shaft-shaped portion 1 includes an insert portion 11 and a base portion 12. The insert portion 11 has a shaft shape and is formed with a male thread. However, in the vicinity of one end of the insert portion 11, no male thread is formed, and a neck 13 with a reduced diameter is formed. The insert portion 11 and the base portion 12 are made of metal. As the metal, for example, aluminum or stainless steel is used.

The base portion 12 projects in a width direction at one end of the insert portion 11. The width direction is a direction orthogonal to the length direction of the insert portion 11. The width direction of the insert portion 11 in which the male thread is formed can be paraphrased as a radial direction. The base portion 12 is formed in a disk shape. The center of the disk-shaped base portion 12 and the center of the insert portion 11 in the radial direction coincide with each other. As shown in FIG. 3, a flat chamfered portion 122 is formed on a part of an outer peripheral surface 121 of the base portion 12. An annular chamfered portion 124 is formed at the boundary between the outer peripheral surface 121 of the base portion 12 and a front surface 123.

The IC tag 2 is fixed to the front surface 123 of the base portion 12. The IC tag 2 is an electronic component such as an ultra-small (e.g., 2.5 mm, 2.5 mm, and 2 mm in length, width, and thickness) chip in which an IC chip for recording information and an antenna for wireless communication are combined. A radio frequency identification (RFID) reader/writer R (see FIG. 4) is used for reading and writing information.

The IC tag 2 generally includes an active tag and a passive tag. The active tag is equipped with a battery and transmits a radio wave with its power. The passive tag does not incorporate a battery, receives a radio wave from the reader/writer R, and is driven using the radio wave as a power source.

The IC tag 2 fixed to the front surface 123 of the base portion 12 is a passive tag. A back surface 22 of the IC tag 2 is fixed to the front surface 123 of the base portion 12 so that the antenna is positioned on the side of a front surface 21. The back surface 22 of the IC tag 2 is colored in a color different from that of the other surfaces so as not to be erroneously fixed. The IC tag 2 is temporarily attached to the front surface 123 of the base portion 12 by applying an epoxy resin adhesive 23 (see FIG. 3) to the back surface 22.

The IC tag 2 temporarily attached to the front surface 123 of the base portion 12 is molded with the head portion 3 made of resin. The head portion 3 includes a main body portion 31 formed in a bottomed deformed cylindrical shape (in FIGS. 1 and 2, the bottom is depicted on the upper side), and a folded-back portion 32 bending and extending to the outer circumferential portion of the back surface of the base portion 12 at the opening end of the main body portion 31. As shown in FIG. 1, an annular groove portion 4 is provided between the inner periphery of the folded-back portion 32 and the neck 13 of the insert portion 11.

The main body portion 31 is formed in a bottomed cylindrical shape having the same outer diameter over the entire length except for both end edges. As shown in FIG. 2, a straight knurl pattern is formed in a length direction on the outer peripheral surface of the head portion 3. A radius is provided at an outer peripheral edge of one end of the main body portion 31, that is, at the boundary portion between an end surface 312 that covers the front surface 21 of the IC tag 2 and a side surface 311a.

As shown in FIG. 1, in the main body portion 31, the side surface 311a that covers the IC tag 2 on the front surface 123 of the base portion 12 is formed thick, and the end surface 312 that covers the front surface 21 of the IC tag 2 is formed thin. In the main body portion 31, a side surface 311b that covers the outer peripheral surface 121 of the base portion 12 is formed thin. Since the flat chamfered portion 122 is formed on a part of the outer peripheral surface 121 of the base portion 12, the inner surface of the side surface 311b formed thin of the main body portion 31 includes a locking portion 313 (see FIG. 4) joined to the chamfered portion 122 of the base portion 12.

Although not shown, such a head portion 3 is molded with an injection mold having a cavity (space). The cavity is a space that defines the head portion 3. A molten resin is injected into the cavity after the base portion 12 is set. By solidifying the molten resin, the head portion 3 within which the IC tag 2 is resin-molded on the front surface 123 of the base portion 12 is formed. When the molten resin is injected into the cavity, the IC tag 2 is temporarily fixed on the front surface 123 of the base portion 12 and thus is not displaced.

The bolt with an IC tag thus manufactured is used in various fields by writing data to the IC tag 2. For example, the bolt with an IC tag is used in a mold management system. A mold (hereinafter referred to as a "managed mold") M (see FIG. 4) managed in a mold management system is stored, for example, for 15 years or longer after the production of the product is finished.

As shown in FIG. 4, the bolt with an IC tag used to manage the managed mold M is screwed into a mounted portion (not numbered) such as the front that does not adversely affect the performance of the managed mold M. A screw hole is formed in the managed mold M in advance. When an operator grasps and turns the head portion 3, the insert portion 11 is screwed into the mounted portion of the managed mold M. Since the chamfered portion 122 formed on the base portion 12 and the locking portion 313 formed on the head portion 3 are joined to each other, when the head portion 3 is turned, the insert portion 11 is screwed into the screw hole without the head portion 3 turning independently from the insert portion 11. The head 3 of the screwed bolt with an IC tag projects from the surface of the managed mold M.

In the IC tag 2 of the bolt with an IC tag, data such as a management number, a manufacturing date, the number of times of use, and warehouse entry/exit management is written by the reader/writer R. The reader/writer R is oriented to face the end surface 312 of the head portion 3 of the bolt with an IC tag. The illustrated reader/writer R directly faces the head portion 3 of the bolt with an IC tag. However, since the head portion 3 is molded from resin, the reader/writer R can communicate with the IC tag 2 even when the reader/writer R faces the bolt with an IC tag from an oblique direction. Since the base portion 12 is made of metal, the base portion 12 functions as an antenna in communication between the reader/writer R and the IC tag 2. Therefore, in communication between the IC tag 2 and the reader/writer R, since the antenna built in the IC tag 2 and the base portion 12 function as antennas, more efficient communication becomes possible.

The reader/writer R stores the data written in the IC tag 2 in a database server as an asset management book. The managed mold M into which the bolt with an IC tag is screwed is stored in a warehouse or the like. Since the bolt with an IC tag does not peel off like a bar code seal, it is possible to reliably manage the managed mold M stored for ten years or longer. Further, the head portion 3 does not fall off from the base portion 12 because the folded-back portion 32 bends and extends to the back surface 125 of the base portion 12 and is sandwiched between the base portion 12 and the mounted portion of the managed mold M.

The managed mold M stored in a warehouse or the like is managed when necessary or periodically. In this management, the reader/writer R is oriented to face the bolt with an IC tag screwed into the managed mold M. The data written in the IC tag 2 of the bolt with an IC tag is read through communication with the reader/writer R. This reading of data can be performed instantly. When the managed mold M is used, data such as the usage status is communicated from the reader/writer R to be additionally recorded in the IC tag 2. This additionally recorded information is also additionally recorded to the asset management book of the database server.

When the managed mold M is discarded, the bolt with an IC tag is removed from the managed mold M. At this time, even when a pulling force is applied to the head portion 3, the head portion 3 does not separate from the shaft-shaped portion 1 because the folded-back portion 32 bends and extends to the back surface 125 of the base portion 12. The data written in the IC tag 2 of the removed bolt with an IC tag is initialized, and the bolt with an IC tag is reused in another managed mold M.

The embodiment of the bolt with an IC tag according to the present invention is not limited to the above description, and includes modifications and improvements to the extent that the object of the present invention can be achieved.

For example, in the above embodiment, the insert portion 11 has a shaft shape and a male thread is formed thereon. However, the insert portion 11 may be a pin and no male thread is formed thereon, or the pin is not limited to a cylindrical shape, and may be a prismatic shape.

In the above embodiment, the base portion 12 is formed in a disk shape. However, the base portion 12 may have a polygonal shape. In the above embodiment, the chamfered portion 122 is formed on the outer peripheral surface 121 of the base portion 12, and the head portion 3 includes the locking portion 313 joined to the chamfered portion 122. However, the outer peripheral surface 121 of the base portion 12 may have a knurl pattern without the chamfered portion 122, so that the inner surface of the head portion 3 enters the knurl pattern. When the base portion 12 and the head portion 3 are solidly integrated together, the base portion may not include the chamfered portion 122, and the head portion 3 may not include the locking portion 313.

In the above embodiment, the head portion 3 includes the folded-back portion 32 that bends and extends to the outer circumferential portion of the back surface 125 of the base portion 12. However, when the main body portion 31 and the front surface 123 and the outer peripheral surface 121 of the base portion 12 are solidly integrated together, the head portion 3 may not include the folded-back portion 32, and at least the front surface 123 side of the base portion 12 may be molded so as to seal the IC tag 2.

In the above embodiment, the insert portion 11 and the base portion 12 are made of metal. However, any one or both of the insert portion 11 and the base portion 12 may be made of resin.

In the above embodiment, the IC tag 2 is a passive tag. However, the IC tag 2 may be an active tag, in particular, if the bolt with an IC tag is large.

In the above embodiment, the IC tag 2 is combined with an antenna for wireless communication. However, the IC tag 2 may not be combined with an antenna. When the IC tag 2 without an antenna is used, the base portion 12 is preferably made of metal. When the base portion 12 is made of metal, the base portion 12 functions as an antenna of the IC tag 2. On the other hand, when the IC tag 2 in combination with an antenna is used, the base portion 12 may be made of metal or resin.

In the above embodiment, a straight knurl pattern is formed on the outer peripheral surface of the head portion 3. However, the knurl pattern may be diamond, square, or the like. Alternatively, when the head portion 3 is molded from a slip-resistant material, or when the head portion 3 is formed into a prismatic shape, a knurl pattern does not need to be formed.

In the above embodiment, the case where the bolt with an IC tag is used in the management of the managed mold M has been described. However, the bolt with an IC tag can be used in the field of physical distribution, the field of railroad, and the food and drink industry. In the physical distribution field, the distribution of products is managed by screwing the bolt into the body of a track, a container, or the like. In the railroad field, the loosening of the bolt is detected. In this case, the bolt used is larger in size than when screwed into the managed mold M. In the food and drink industry, in a rotary sushi restaurant, the bolt with an IC tag may be mounted on a dish to manage the elapsed time of the sushi placed on the dish, or the sushi placed on the dish may be directly delivered to the seat of a customer who individually ordered.

In summary, the mounting member with an IC tag to which the present invention is applied, can take various embodiments as long as it has the following configuration.

A mounting member with an IC tag according to the present invention includes:
a shaft-shaped portion 1 including an insert portion 11 having a shaft shape and a base portion 12 projecting in a width direction at one end of the insert portion 11;
an IC tag 2 fixed on a front surface 123 of the base portion 12; and
a head portion 3 made of resin, within which at least a front surface 123 side of the base portion 12 is molded so as to seal the IC tag 2.

With respect to the mounting member with an IC tag, the insert portion 11 is inserted into a mounted portion, and the head portion 3 projects from the mounted portion. The IC tag 2 fixed to the base portion 12 is sealed with the head portion 3. Since the head portion 3 is made of resin, the bolt with an IC tag can be easily manufactured. With respect to the IC tag provided in the bolt with an IC tag, the directivity of communication is not restricted in the direction in which the IC tag projects from the mounted portion. A reader/writer R that communicates with the IC tag 2 can communicate without directly facing the IC tag 2.

In the mounting member with an IC tag according to the present invention,
a male thread is formed on the insert portion 11.

Since the male thread is formed on the insert portion 11, the mounting member with an IC tag can be screwed into the mounted portion and can be prevented from falling off from the mounted portion.

In the mounting member with an IC tag according to the present invention, the head portion 3 includes a folded-back portion 32 bending and extending to an outer circumferential portion of a back surface 125 of the base portion 12.

Since the head portion 3 includes the folded-back portion 32 bending and extending to the outer circumferential portion of the back surface 125 of the base portion 12, the mounting member with an IC tag can be prevented from falling off from the base portion 12. Even when a pulling force is applied to the head portion 3, the head portion 3 does not separate from the shaft-shaped portion 1 because the folded-back portion 32 bends and extends to the back surface 125 of the base portion 12.

In the mounting member with an IC tag according to the present invention, the base portion 12 is formed in a disk shape and includes a chamfered portion 122 on a part of its outer peripheral surface 121. The head portion 3 includes a locking portion 313 joined to the chamfered portion 122.

Even when the base portion 12 is formed in a disk shape, since the chamfered portion of the outer peripheral surface 121 and the locking portion 313 of the head portion 3 are joined to each other, the mounting member with an IC tag can prevent the head portion 3 from turning independently from the base portion 12 when the head portion 3 is turned.

In the mounting member with an IC tag according to the present invention, the head portion 3 is formed in a cylindrical shape and has an outer peripheral surface having a knurl pattern.

Even when the head portion 3 is formed in a cylindrical shape, the outer peripheral surface having a knurl pattern can prevent slipping when the head portion 3 is turned.

EXPLANATION OF REFERENCE NUMERALS

1 shaft-shaped portion
11 insert portion
12 base portion
122 chamfered portion
123 front surface
125 back surface
2 IC tag
3 head portion
31 main body portion
32 folded-back portion
313 locking portion

The invention claimed is:

1. A mounting member with an IC tag, comprising:
    a shaft-shaped portion comprising an insert portion having a shaft shape and a base portion projecting in a width direction at one end of the insert portion;
    an IC tag fixed on a front surface of the base portion; and
    a head portion made of resin, within which at least a front surface side of the base portion is molded so as to seal the IC tag,
    wherein the base portion is formed in a disk shape and includes (1) a chamfered portion on a part of its outer peripheral surface or (2) a knurl pattern on at least part of its outer peripheral surface and
    wherein (1) the head portion includes a locking portion joined to the chamfered portion or (2) an inner surface of the head portion enters the knurl pattern on the base portion.

2. The mounting member with an IC tag according to claim 1,
    wherein a male thread is formed on the insert portion.

3. The mounting member with an IC tag according to claim 1,
    wherein the head portion includes a folded-back portion bending and extending to an outer circumferential portion of a back surface of the base portion.

4. The mounting member with an IC tag according to claim 1,
    wherein the head portion is formed in a cylindrical shape and has an outer peripheral surface having a knurl pattern.

* * * * *